United States Patent
Kuroe

(10) Patent No.: US 12,102,502 B2
(45) Date of Patent: Oct. 1, 2024

(54) ORTHODONTIC EXPANSION DEVICE

(71) Applicants: Medical Corporation KUROE ORTHODONTIC CLINIC, Kagoshima (JP); Dentalead Corporation, Osaka (JP)

(72) Inventor: Kazuto Kuroe, Kagoshima (JP)

(73) Assignees: MEDICAL CORPORATION KUROE ORTHODONTIC CLINIC, Kagoshima (JP); DENTALEAD CORPORATION, Osaka (JP)

( * ) Notice: Subject to any disclaimer, the term of this patent is extended or adjusted under 35 U.S.C. 154(b) by 0 days.

(21) Appl. No.: 17/492,029

(22) Filed: Oct. 1, 2021

(65) Prior Publication Data
US 2022/0142742 A1 May 12, 2022

(30) Foreign Application Priority Data
Nov. 9, 2020 (JP) .................................. 2020-186665

(51) Int. Cl.
*A61C 7/10* (2006.01)
(52) U.S. Cl.
CPC ...................................... *A61C 7/10* (2013.01)
(58) Field of Classification Search
CPC ......................................................... A61C 7/10
USPC ................................................. 433/7, 18, 19
See application file for complete search history.

(56) References Cited

U.S. PATENT DOCUMENTS

| | | | | |
|---|---|---|---|---|
| 6,334,771 | B1* | 1/2002 | Liou | A61C 7/36 433/7 |
| 2003/0049581 | A1* | 3/2003 | DeLuke | A61C 7/10 433/7 |
| 2021/0196432 | A1* | 7/2021 | Yousefian | A61C 7/10 |

FOREIGN PATENT DOCUMENTS

| | | | | |
|---|---|---|---|---|
| DE | 2941570 A1 * | 4/1981 | | A61C 7/10 |
| EP | 0919207 A1 * | 7/1998 | | A61C 7/10 |
| JP | H11-169385 A | 6/1999 | | |
| JP | 2019042297 A * | 3/2019 | | |

OTHER PUBLICATIONS

DE 2941570 A1 (Nichtnennung Antrag AUF) Tooth-correction jaw expansion device—has body in front tongue chamber with hinging arms bearing against screw, Apr. 23, 1981. [retrieved on Oct. 27, 2022], Translation retrieved from: Espacenet (Year: 1981).*

(Continued)

*Primary Examiner* — Yogesh P Patel
*Assistant Examiner* — Courtney N Huynh
(74) *Attorney, Agent, or Firm* — GREENBLUM & BERNSTEIN, P.L.C.

(57) ABSTRACT

An orthodontic expansion device for expanding a maxilla A and a maxillary dentition B includes: two hinges arranged with an interval; a screw; two intermediate members configured to be driven in directions of opening on a front end side with the respective hinges as fulcrums, by rotation operation of the screw; at least two arm members supported by the intermediate members and extending laterally and diagonally forward from the intermediate members; and a plurality of holding members supported by the arm members and configured to be attached to crowns of both lateral segments of the maxillary dentition B.

6 Claims, 9 Drawing Sheets

(56) References Cited

OTHER PUBLICATIONS

JP2019042297A (Yoshida Keiichiro) (Dentech KK) Expansion Screw, Mar. 22, 2019. [retrieved on Oct. 27, 2022], Translation retrieved from: Espacenet (Year: 2019).*

JP 2019042297 A (Yoshida Keiichiro) (Dentech KK) Expansion Screw, Mar. 22, 2019. [retrieved on Jan. 25, 2023], Translation retrieved from: Espacenet (Year: 2019).*

* cited by examiner

ORTHODONTIC EXPANSION DEVICE

BACKGROUND OF THE INVENTION

Field of the Invention

The present invention relates to a device used in orthodontic treatment, and particularly to an orthodontic expansion device used to expand the maxilla and the maxillary dentition.

Background Art

Malocclusion is caused by hypogrowth of the maxilla and the mandible (upper and lower jawbones) (i.e. reduced size due to constriction and retrognathism of jawbones), collapsed dental arch, and larger crown size. Such hypogrowth of the maxilla and the mandible, collapsed dental arch, and larger crown size cause morphological skeletal abnormalities such as a prognathic face with midfacial protrusion, a mandibular prognathic face with mandible protrusion, double teeth, and crowding, and further cause abnormalities of general body functions such as eating, chewing, swallowing, breathing, and sleep. In particular, hypogrowth of the maxilla, which is the basis of the face and jawbones, and collapsed maxillary dental arch can be considered as etiologies of all malocclusions.

Treatment of malocclusion requires improvement of constricted maxilla and smaller mandible and larger crown size. An expansion device is effective in improving constricted maxilla. Since it is impossible to reduce the crown size, there is no choice but to extract permanent teeth. However, if the maxilla and the maxillary dentition can be expanded to restore their proper form, the treatment can be conducted without tooth extraction. Success of orthodontic treatment significantly depends on the expansion of the maxilla and the maxillary dentition, which is a causal therapy for abnormality factors.

Expansion devices used for orthodontic treatment are roughly classified into three types (hyrax type, universal type, and fan type) depending on the differences in structure. In hyrax type and universal type, a screw for expansion is placed laterally to the midpalatal suture extending from the center of the maxilla to the front and back, and the activation of the screw (by rotating operation of the screw) causes the lateral segments of the maxilla and the maxillary dentition as seen from an axial plane to expand laterally approximately in parallel. The device illustrated in FIG. 1 in Japanese Patent Application Laid-Open No. H11-169385 is called hyrax type. In the device, two arms are located on opposite sides in a central unit, and each arm is provided with a mounting band for teeth. A screw is activated to expand the lateral segments of the maxilla and the maxillary dentition laterally approximately in parallel.

In fan type, a screw for expansion is placed in a lateral direction, and one hinge is provided at the back end as a fulcrum at the time of expansion. When the screw is activated by rotating operation of the screw, expansion arms open with the hinge as the fulcrum, and the lateral segments of the maxilla and the maxillary dentition as seen from an axial plane move diagonally forward and expand in a fan shape. The device illustrated in FIG. 2 in Japanese Patent Application Laid-Open No. H11-169385 is called fan type.

SUMMARY OF THE INVENTION

The hyrax type is effective in improving malocclusion with constricted maxilla and the collapsed maxillary dentition, but cannot improve malocclusion with retrognathism of the maxilla and the maxillary dentition. The fan type, on the other hand, involves expansion in a fan shape, and therefore is effective for malocclusion with retrognathism of the maxilla and the maxillary dentition. However, since the conventional fan type has one hinge as illustrated in FIG. 2 in Japanese Patent Application Laid-Open No. H11-169385, the front-back diameter (front-back length) from the screw to the hinge is long, which causes problems such as the hinge contact the soft palate at the posterior part of the palate. Moreover, although the conventional fan type enables expansion in a fan shape, its lateral expansion is small, and thus the fan type is not particularly effective for constricted maxilla and the collapsed maxillary dentition.

Thus, the conventional fan type requires selection of patients subjected to treatment, in orthodontic treatment primarily intended to improve various skeletal and dentition occlusion abnormalities. This hinders sufficient morphological improvement of the maxilla and the maxillary dentition.

In view of the problem stated above, the present invention has an object of providing an orthodontic expansion device that can improve the problem of the conventional fan type and achieve sufficient lateral expansion and thus is effective in morphological improvement of the maxilla and the maxillary dentition and effective in improvement of general body functions.

To solve the problem stated above, an orthodontic expansion device according to a first aspect of the present invention is an orthodontic expansion device used in orthodontic treatment to expand a maxilla and a maxillary dentition, the orthodontic expansion device including: two hinges arranged with an interval; a screw; two intermediate members configured to be driven in directions of opening on a front end side with the respective hinges as fulcrums, by rotating operation of the screw; at least two arm members supported by the intermediate members and extending laterally and/or diagonally forward from the intermediate members; and at least two holding members supported by the arm members and configured to be attached to crowns of both lateral segments of the maxillary dentition.

According to a second aspect of the present invention, in the orthodontic expansion device, the two hinges are rotatably supported at both ends of a connection member with a fixed interval therebetween, and one of the hinges and one end of the connection member are rotatably supported by a back end support portion of one of the intermediate members, and an other one of the hinges and an other end of the connection member are rotatably supported by a back end support portion of an other one of the intermediate members.

According to a third aspect of the present invention, in the orthodontic expansion device, the two intermediate members include engaging portions configured to synchronize operation with the respective hinges as the fulcrums, with the rotation operation of the screw.

According to a fourth aspect of the present invention, in the orthodontic expansion device, in a state in which the holding members are attached to the crowns of the both lateral segments of the maxillary dentition, the two intermediate members are configured to move forward with movement of the two intermediate members being driven in the directions of opening on the front end side with the respective hinges as the fulcrums, by the rotation operation of the screw.

According to a fifth aspect of the present invention, in the orthodontic expansion device, in a state in which the holding members are attached to the crowns of the both lateral segments of the maxillary dentition, the holding members are configured to move in a fan shape and laterally in approximately symmetrical directions with respect to a midpalatal suture of the maxilla as a center line with movement of the two intermediate members being driven in the directions of opening on the front end side with the respective hinges as the fulcrums, by the rotation operation of the screw.

As described above, the orthodontic expansion device according to the present invention includes two hinges for expansion of the maxilla and the maxillary dentition. Hence, the front-back diameter from the screw to the fulcrum can be shortened as compared with the conventional fan type, so that the device can be reduced in size and the conventional problems such as the hinge contact the soft palate at the posterior part of the palate can be solved. Moreover, functions such as eating, chewing, swallowing, speech, articulation, breathing, and sleep are not impaired. The orthodontic expansion device thus has the effect of widening the range of choice of patients subjected to treatment, as the device can be used even for children with small maxilla and the like.

Furthermore, the maxilla and the maxillary dentition can be greatly expanded in a fan shape and also the lateral segments of the maxillary dentition can be greatly expanded laterally, as compared with the conventional fan type. The orthodontic expansion device is thus effective in morphological improvement of the maxilla and the maxillary dentition and effective in improvement of general body functions.

DESCRIPTION OF THE PREFERRED EMBODIMENTS

The best mode for carrying out the present invention will be described with reference to drawings. FIGS. 1 to 6B illustrate an embodiment of the present invention. In these drawings, reference sign S is an orthodontic expansion device according to the present invention.

Figure 1:
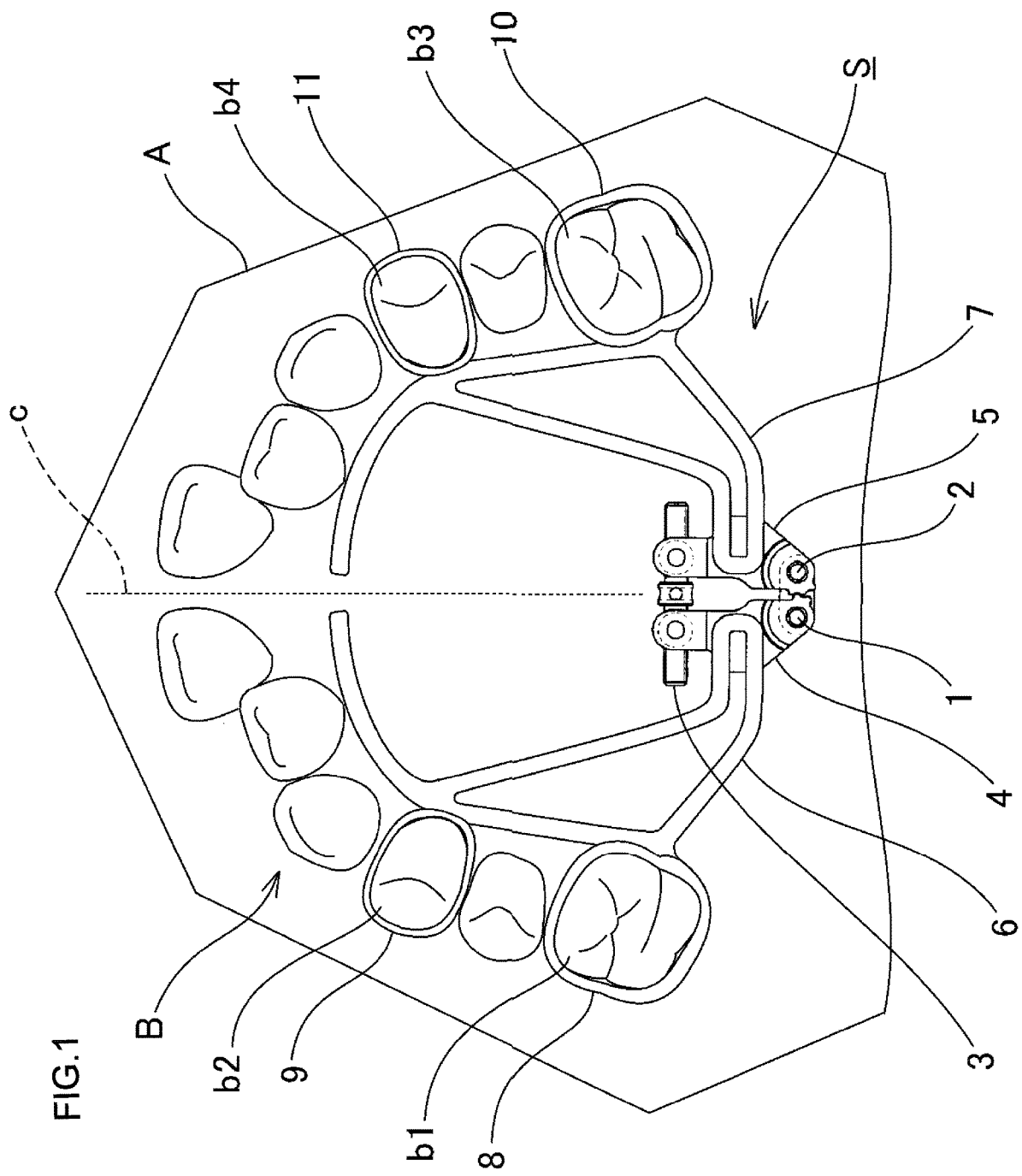
FIG. 1 is a diagram illustrating a state in which an orthodontic expansion device according to the present invention is attached to a maxilla.
Figure 2:
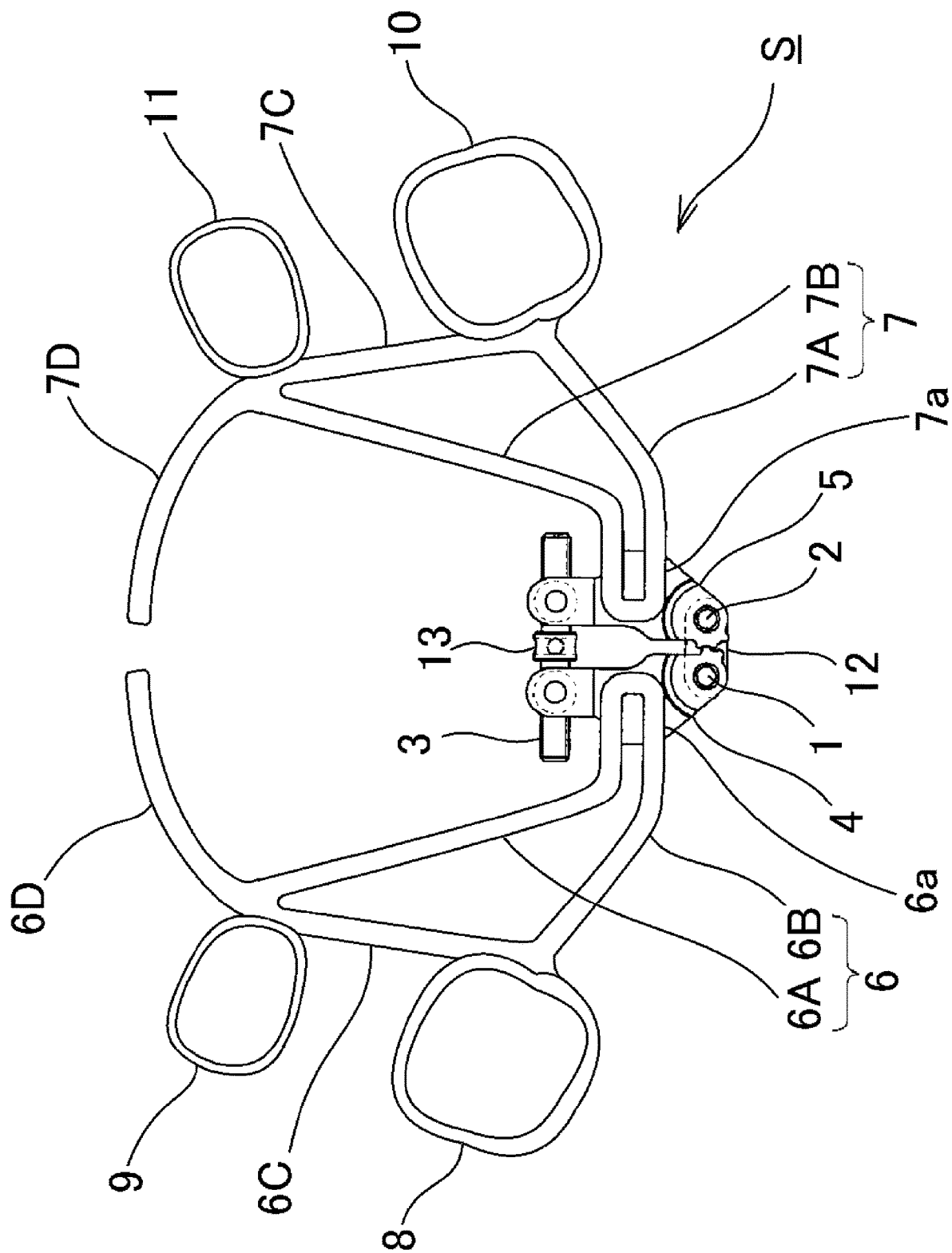
FIG. 2 is a front view of the expansion device according to the present invention.

The orthodontic expansion device S (hereafter referred to as "the device S") is a device that is used in orthodontic treatment to expand the maxilla and the maxillary dentition. As illustrated in FIGS. 1 and 2, the device S includes: two hinges 1 and 2; a screw 3; two intermediate members 4 and 5 capable of being driven in the directions of opening on the front end side with the hinges 1 and 2 respectively as fulcrums, by rotation operation of the screw 3; two arm units 6 and 7 supported to extend laterally and diagonally forward respectively from the intermediate members 4 and 5; and four band members 8 to 11 attached to the tips of the arm units 6 and 7.

Figure 3A:
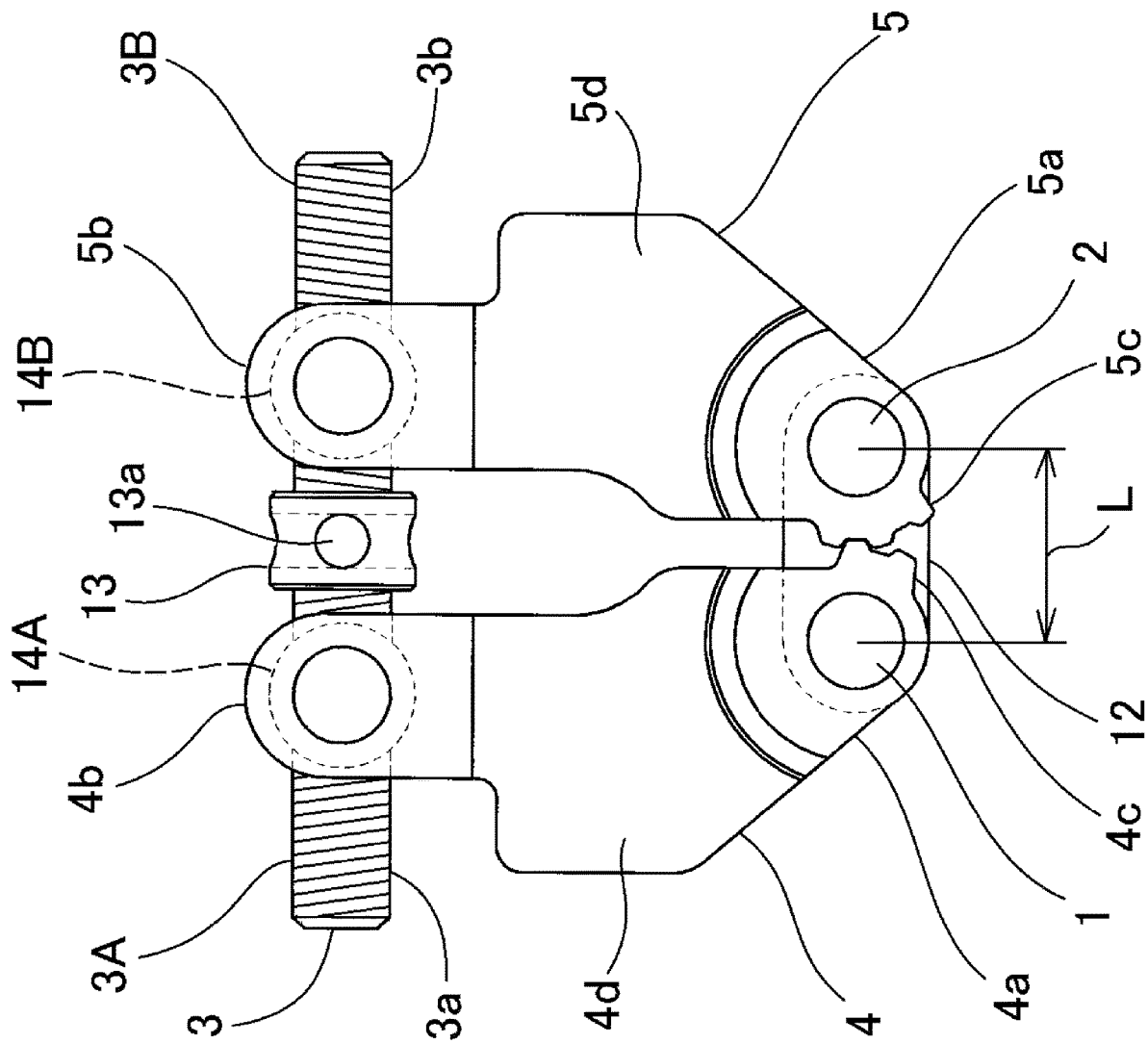
FIG. 3A is a partially enlarged front view of main parts of the expansion device illustrated in FIG. 2.
Figure 3B:
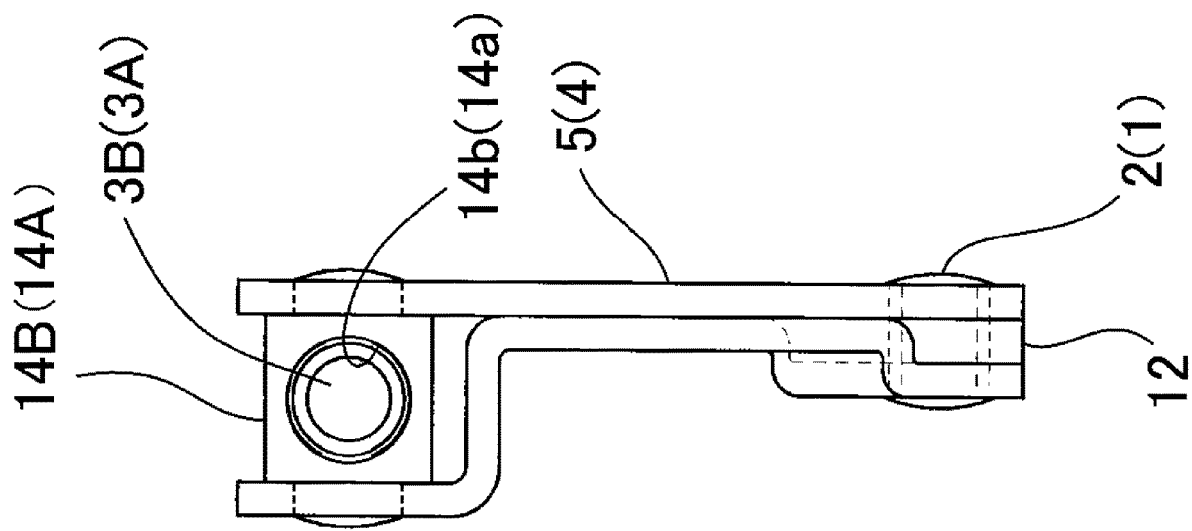
FIG. 3B is a partially enlarged side view of main parts of the expansion device illustrated in FIG. 2.

The two hinges 1 and 2 are rotatably supported at both ends of a connection member 12 with an interval L therebetween, as illustrated in FIGS. 3A and 3B. One hinge 1 and one end of the connection member 12 are rotatably supported by a back end support portion 4a of one intermediate member 4. The other hinge 2 and the other end of the connection member 12 are rotatably supported by a back end support portion 5a of the other intermediate member 5. The interval L is desirably set in a range of 3 mm to 6 mm.

In the screw 3, left and right screw bodies 3A and 3B arranged side by side are coaxially fixed and supported by an intermediate operation body 13. Helical threads 3a and 3b opposite in direction to each other are provided around the screw bodies 3A and 3B respectively. The intermediate operation body 13 has operation through holes 13a for activation of the screw 3 by rotating the screw 3 for expansion, at a plurality of locations on the circumference.

The screw 3 having the above-described structure is supported between a front end support portion 4b of one intermediate member 4 and a front end support portion 5b of the other intermediate member 5, as illustrated in FIG. 3A. In more detail, an intermediate support shaft 14A is pivotally supported by the front end support portion 4b of one intermediate member 4 so as to be rotatable, and an intermediate support shaft 14B is pivotally supported by the front end support portion 5b of the other intermediate member 5 so as to be rotatable. One intermediate support shaft 14A has a groove hole 14a having, on its inner circumferential surface, a helical groove (not illustrated) that screws with the helical thread 3a of one screw body 3A. The other intermediate support shaft 14B has a groove hole 14b having, on its inner circumferential surface, a helical groove (not illustrated) that screws with the helical thread 3b of the other screw body 3B.

In the screw 3, in a state in which the operation body 13 is located in the middle, one screw body 3A is rotatably supported by the front end support portion 4b of the intermediate member 4 via the intermediate support shaft 14A, and the other screw body 3B is rotatably supported by the front end support portion 5b of the intermediate member 5 via the intermediate support shaft 14B. When the intermediate operation body 13 is rotated in one direction around the axis, the intermediate support shafts 14A and 14B move so as to separate from each other to the left and the right. This drives the two intermediate members 4 and 5 in the directions of opening on the front end side with the hinges 1 and 2 respectively as fulcrums. When the intermediate operation body 13 is rotated in the other direction around the axis, the intermediate support shafts 14A and 14B move so as to approach each other. Thus, the two intermediate members 4 and 5 are driven in the directions of approaching each other on the front end side, with the hinges 1 and 2 respectively as fulcrums.

When the screw 3 is activated by rotating the screw 3, the two intermediate members 4 and 5 function to transfer the force resulting from the rotation of the screw 3 to the left and right arm units 6 and 7, with the front end support portions 4a and 5a as force points and the hinges 1 and 2 as fulcrums respectively. Thus, when expanding the left and right band members 8 to 11 via the arm units 6 and 7, the two intermediate members 4 and 5 move forward to enable the left and right band members 8 to 11 to further expand in a fan shape and expand laterally (see FIG. 5A to FIG. 5B). The two intermediate members 4 and 5 include, at their back ends, gear-like engaging portions 4c and 5c that engage with each other to synchronize the movements of the two intermediate members 4 and 5.

The two arm units 6 and 7 are supported by the intermediate members 4 and 5 in a fixed state. One arm unit 6 has a U-shaped bend portion 6a fixed to an arm fixing portion 4d located in the middle of one intermediate member 4, and two arm members 6A and 6B extending in a fan shape from the bend portion 6a. One arm member 6A extends laterally in a slightly upward direction (downward direction in a state in which the device S is attached to the maxilla), and the other arm member 6B extends laterally and diagonally forward in a slightly upward direction. The other arm unit 7 has a U-shaped bend portion 7a fixed to an arm fixing portion 5d located in the middle of the other intermediate member 5, and two arm members 7A and 7B extending in a fan shape from the bend portion 7a. One arm member 7A extends laterally in a slightly upward direction (downward direction in a state in which the device S is attached to the maxilla), and the other arm member 7B extends laterally and diagonally forward in a slightly upward direction.

In the arm unit 6 having the above-described structure, the tips of the two arm members 6A and 6B are connected by a connection member 6C on the inner side of the maxillary dentition B and approximately in the same direction as the maxillary dentition B, and an arc-shaped member 6D extends in an arc shape from the connection member 6C to an intermediate position along the maxillary dentition B. Likewise, in the arm unit 7 having the above-described structure, the tips of the two arm members 7A and 7B are connected by a connection member 7C on the inner side of the maxillary dentition B and approximately in the same direction as the maxillary dentition B, and an arc-shaped member 7D extends in an arc shape from the connection member 7C to an intermediate position along the maxillary dentition B.

The four band members 8 to 11 are configured to be attached to a plurality of crowns of the lateral segments of the left and right maxillary dentitions B, with the midpalatal suture c as an intermediate line. The two band members 8 and 9 are attached respectively to the tips of the arm members 6A and 6B of the arm unit 6. The two band members 10 and 11 are attached respectively to the tips of the arm members 7A and 7B of the arm unit 7.

The members in the device S having the above-described structure, i.e. the two hinges 1 and 2, the screw 3, the two intermediate members 4 and 5, the two arm units 6 and 7, the four band members 8 to 11, the connection member 12, the operation body 13, and the intermediate support shafts 14A and 14B, are all made of stainless steel material.

Usage and operation of the device S will be described below, with reference to drawings.

First, a practitioner attaches the device S to a patient (see FIG. 1). Specifically, the practitioner attaches the device S to the maxilla A and maxillary dentition B of the patient in a treatment position in which the patient opens his or her mouth.

As illustrated in FIG. 1, the device S is attached in the following manner: In a state in which the two intermediate members 4 and 5 are in their initial positions, one band member 8 of the band members 8 and 9 at the tip of one arm unit 6 is attached to a molar crown b1 of one lateral segment (right) (left in FIG. 1) of the maxillary dentition B, and the other band member 9 is attached to a premolar crown b2 of the one lateral segment (right) of the maxillary dentition B. One band member 10 of the band members 10 and 11 at the tip of the other arm unit 7 is attached to a molar crown b3 of the other lateral segment (left) (right in FIG. 1) of the maxillary dentition B, and the other band member 11 is attached to a premolar crown b4 of the other lateral segment (left) of the maxillary dentition B.

After the device S is attached to the maxilla A and maxillary dentition B of the patient in the above-described manner, a rod-shaped operation member (not illustrated) is inserted into the operation through holes 13a of the operation body 13 located directly above the midpalatal suture c passing through the center of the maxilla A. The operation body 13 is then rotated in one direction around the axis to a predetermined angle, to rotate the lateral screw 3.

Figure 5A:
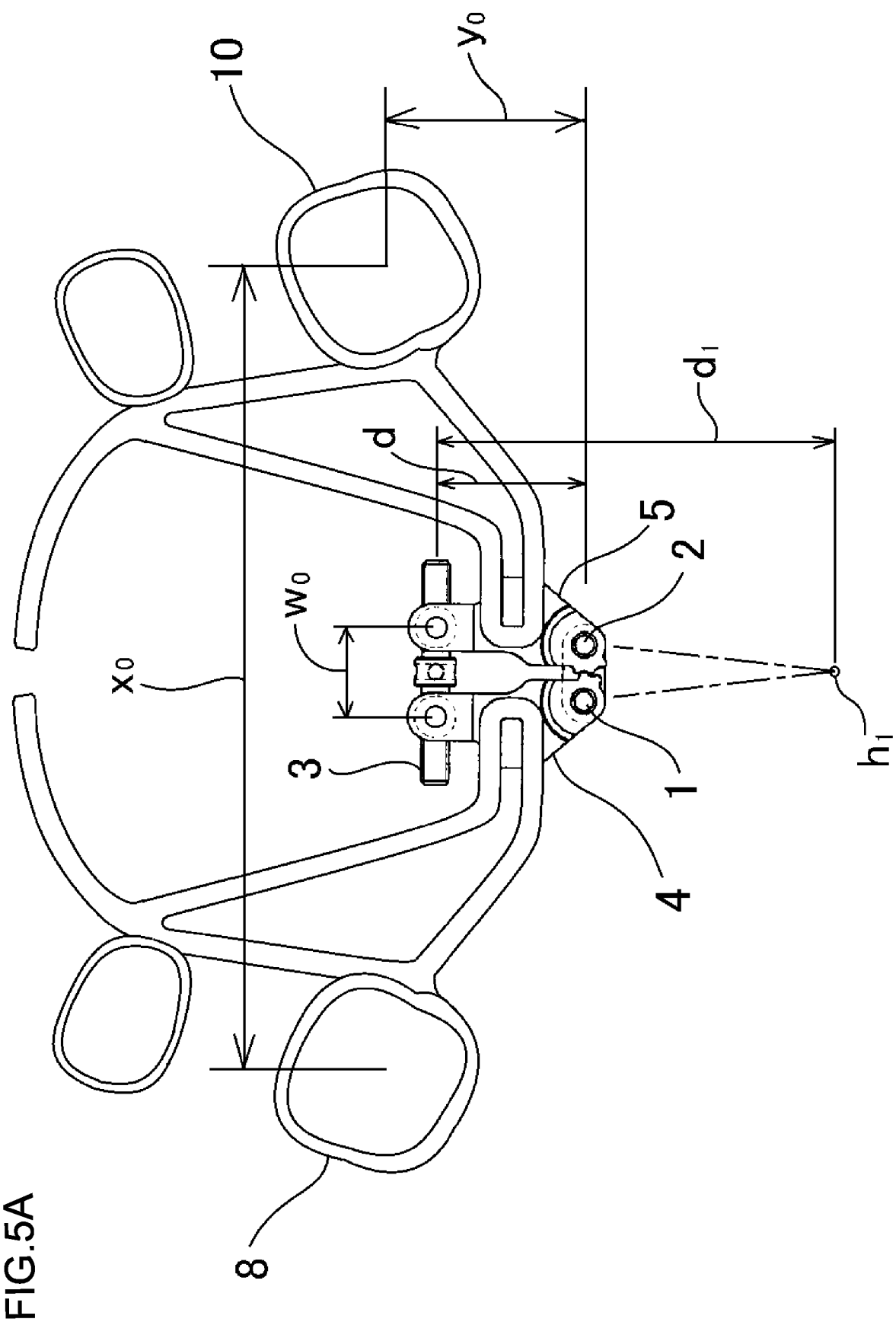
FIG. 5A is a diagram illustrating the expansion device according to the present invention in a state before expansion.

When the lateral screw 3 is activated by rotating the screw 3, the intermediate support shafts 14A and 14B move in the directions of separating from each other to the left and the right. This drives the two intermediate members 4 and 5 in the directions of opening on the front end side with the two hinges 1 and 2 respectively as fulcrums, to move the left two band members 8 and 9 and the right two band members 10 and 11 in the expanding directions as indicated by the arrows in FIG. 5B via the left and right arm units 6 and 7, as illustrated in FIG. 5A to FIG. 5B.

Figure 4:
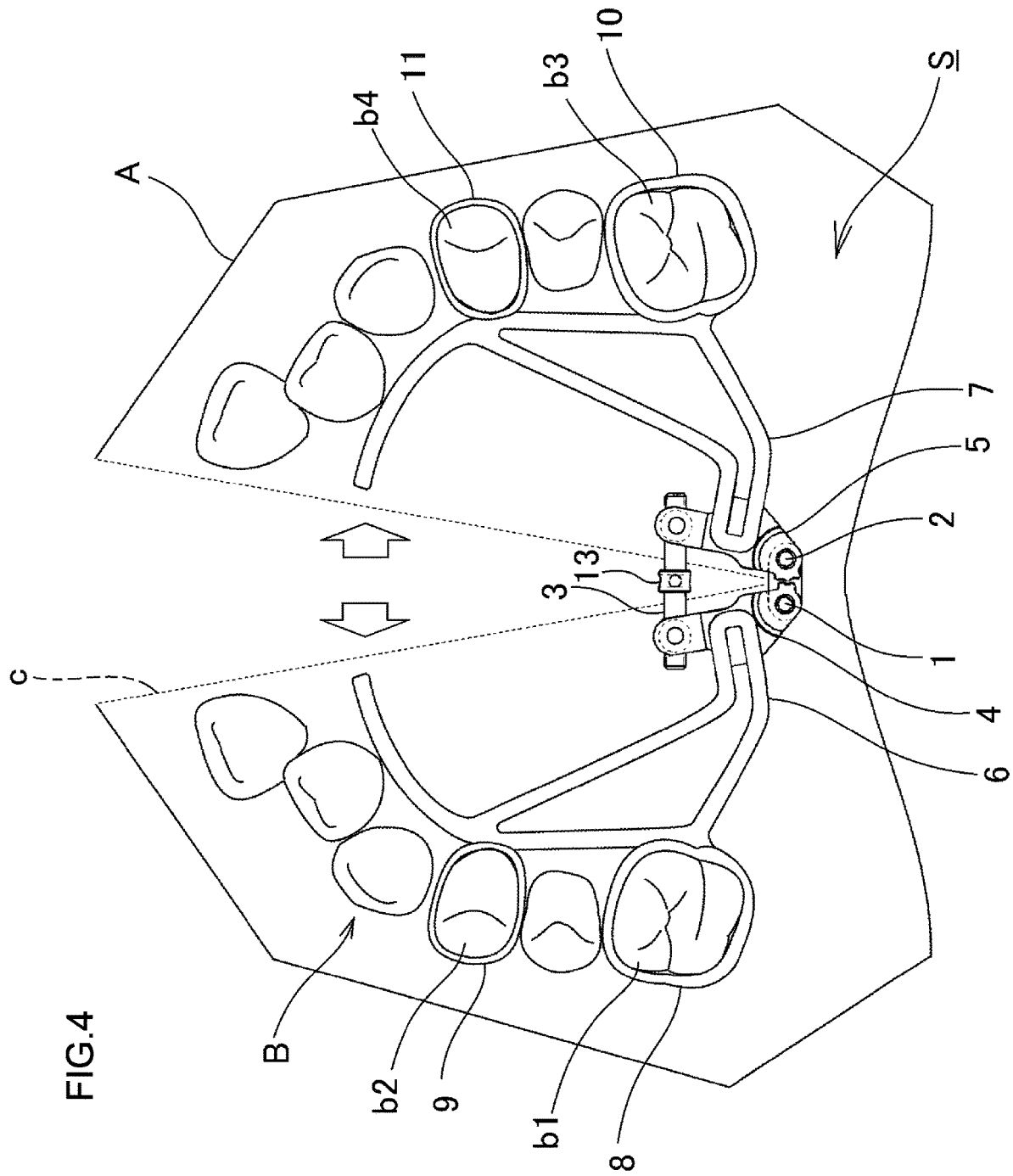
FIG. 4 is a diagram illustrating a state after a screw is rotated, to illustrate the operation of the expansion device according to the present invention.
Figure 5B:
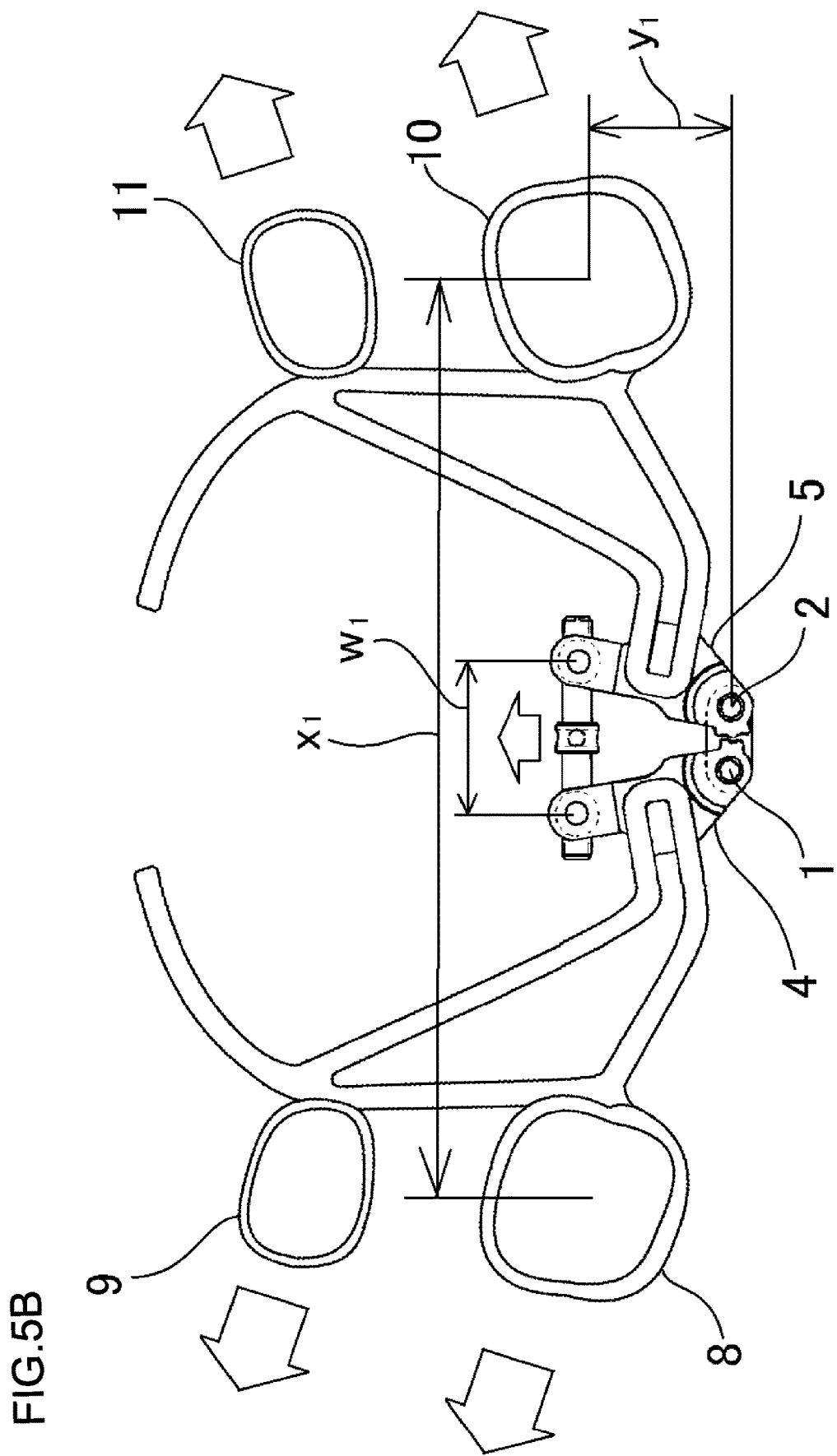
FIG. 5B is a diagram illustrating the expansion device according to the present invention in a state after expansion.

With the movement of the left two band members 8 and 9 and the right two band members 10 and 11 in the expanding directions, the two intermediate members 4 and 5 move forward as indicated by the arrow in FIG. 5B. This increases the movement of the left two band members 8 and 9 and the right two band members 10 and 11 in the expanding directions, so that the maxillary dentition B is greatly expanded in a fan shape and the lateral segments of the maxillary dentition B are greatly expanded laterally. The maxillary dentition B is effectively expanded in this way. FIG. 4 illustrates the state after the expansion.

Figure 6A:
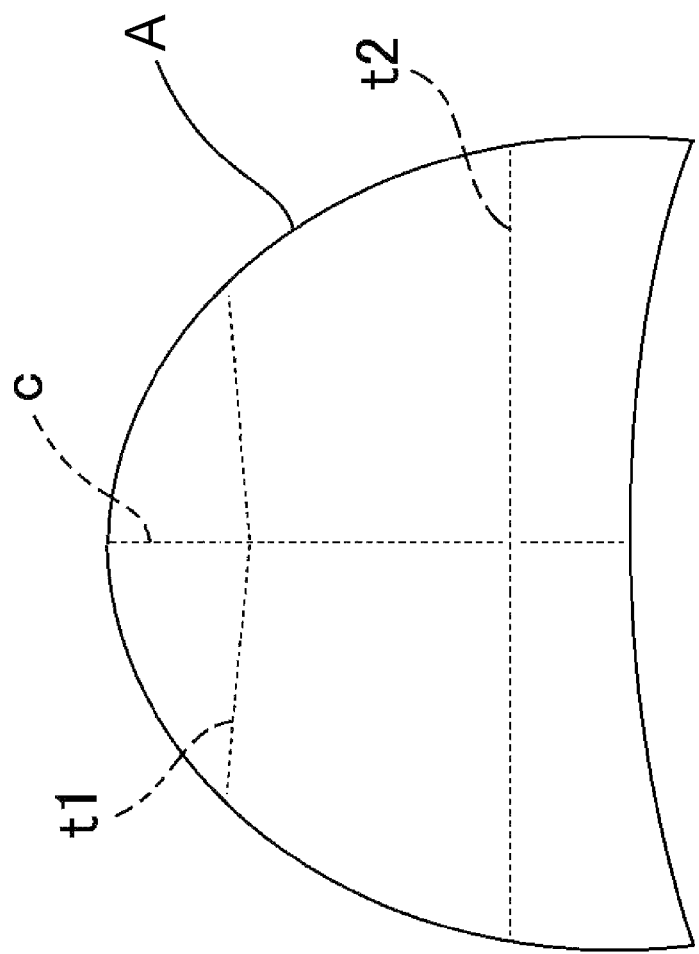
FIG. 6A is a diagram illustrating the maxilla in a state before expansion.
Figure 6B:
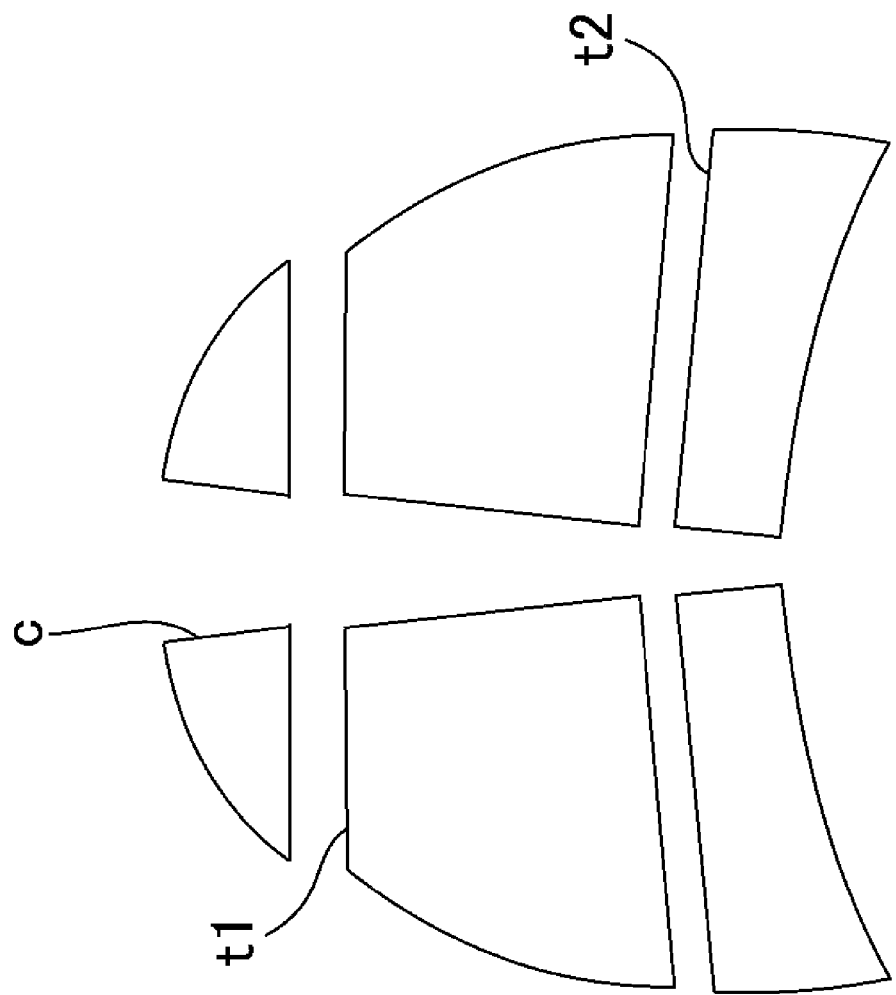
FIG. 6B is a diagram illustrating the maxilla in a state after expansion using the device.

In the maxilla A to which the device S is attached, the midpalatal suture c extending in the front-back direction at the center, the incisive suture t1 extending in the lateral direction near the front, and the lateral palate suture t2 extending in the lateral direction near the back illustrated in FIG. 6A are each separated to greatly expand in a fan shape and also expand laterally by the operation of the device S, as illustrated in FIG. 6B.

As a result of trial-producing the device S illustrated in FIG. 1 and performing measurement, when the expansion ($w_1$-$w_0$ in FIGS. 5A and 5B) between the front end support portions 4b and 5b of the intermediate members 4 and 5 by the rotation of the screw 3 was 4 mm, the lateral movement ($x_1$-$x_0$ in FIGS. 5A and 5B) was 4 mm and the forward movement ($y_0$-$y_1$ in FIGS. 5A and 5B) was 4 mm. Here, the interval L between the hinges 1 and 2 was 4 mm. By rotating the screw 3, the front end support portions 4b and 5b of the intermediate members 4 and 5 can be expanded to 8 mm. In the case where the expansion is 8 mm, it is possible to achieve lateral movement of 10 mm to 12 mm and forward movement of 9 mm to 10 mm.

The device S has the following effects.

The device S includes the two hinges 1 and 2 for expansion. Hence, the front-back diameter between the screw 3 for expansion and the hinge (the front-back distance between the screw and the hinge), i.e. the length d of the hinge portion (the length d1 of the hinge portion in the conventional fan type), can be shortened as compared with the conventional fan type (structure that performs expansion using one hinge $h_1$ as a fulcrum), as illustrated in FIG. 5A. This contributes to a smaller device size.

As a result of the length of the hinge portion being shortened, the hinge portion can be kept from contact the soft palate at the posterior part of the palate in a state in which the device S is attached, with it being possible to prevent damage to the mucous membrane and the soft palate. Moreover, shortening the length of the hinge portion allows the screw portion to be located backward, as a result of which greater expansion (expansion rate) can be achieved. A smaller device size suppresses impairment of functions such as feeding, chewing, swallowing, speech, articulation, breathing, and sleep. In addition, the range of patients subjected to treatment widens, and even children with small maxilla can use the device.

The device S expands the maxilla and the maxillary dentition in a fan shape with the two hinges 1 and 2 as fulcrums. Since the stress associated with the expansion can be distributed as compared with the case of expanding the maxilla and the maxillary dentition with one hinge ($h_1$) as a fulcrum, the screw and the hinge portion are not exposed to excessive force during expansion. This contributes to improved durability.

The device S plays a significant role as a device capable of improving both hypogrowth of the maxilla and collapsed maxillary dental Arch which cause malocclusion, and is more effective in morphological improvement of the maxilla and the maxillary dentition and improvement of general body functions such as eating, chewing, swallowing, breathing, and sleep.

The orthodontic expansion device according to the present invention can be widely used particularly for patients who need morphological improvement of the maxilla and the maxillary dentition and further need improvement of general body functions, regardless of whether they are adults, children, or the elderly.

The orthodontic expansion device according to the present invention is usable as a device for orthodontic treatment.

DESCRIPTION OF REFERENCE SIGNS 1, 2 hinge
3 screw
3A, 3B screw body
3a, 3b helical thread
4, 5 intermediate member
4a, 5a back end support portion
4b, 5b front end support portion
4c, 5c engaging portion
4d, 5d arm fixing portion
6, 7 arm unit
6a, 7a bend portion
6A, 6B, 7A, 7B arm member
6C, 7C, 12 connection member
6D, 7D arc-shaped member
8, 9, 10, 11 band member (holding member)
13 operation body
13a operation through hole
14A, 14B intermediate support shaft
14a, 14b groove hole
A maxilla
B maxillary dentition
b1, b3 molar crown
b2, b4 premolar crown
S device (orthodontic expansion device)

What is claimed is:

1. An orthodontic expansion device used in orthodontic treatment to expand a maxilla and a maxillary dentition, the orthodontic expansion device comprising:
   two hinges arranged with an interval therebetween;
   a screw;
   two intermediate structures configured to be driven in directions of opening on a front end side with the respective hinges as fulcrums, by rotation operation of the screw;
   at least two arms supported by the intermediate structures, wherein the at least two arms each have a bend portion that extends generally parallel to a rotational axis of the screw and an angled portion that extends diagonally forward from the bend portion, and wherein the bend portion is supported on a corresponding one of the intermediate structures; and
   at least two holders supported by the arms, wherein
   the holders are configured to be attached to molar crowns of both lateral segments of the maxillary dentition, such that, the two intermediate structures are configured to move forward while rotating about the respective hinges as the fulcrums with movement of the two intermediate structures being driven in the directions of opening on the front end side with the respective hinges as the fulcrums, by the rotation operation of the screw, wherein,
   in an unexpanded state of the orthodontic expansion device, at least portions of all of the holders are positioned forward of the screw relative to a location of the hinges, wherein
   the screw is positioned forward of the two hinges, and
   in the unexpanded state of the orthodontic expansion device, the rearward most surface of each bend portion is positioned rearward of all the holders and the screw.

2. The orthodontic expansion device according to claim 1, wherein the two hinges are rotatably supported at both ends of a connection with a fixed interval therebetween, and
   wherein one of the hinges and one end of the connection are rotatably supported by a back end support portion of one of the intermediate structures, and an other one of the hinges and an other end of the connection are rotatably supported by a back end support portion of an other one of the intermediate structures.

3. The orthodontic expansion device according to claim 1, wherein the two intermediate structures include engaging portions configured to synchronize operation with the respective hinges as the fulcrums, with the rotation operation of the screw.

4. The orthodontic expansion device according to claim 1, wherein, the holders are configured to be attached to the molar crowns of the both lateral segments of the maxillary dentition, such that, the holders are configured to move in a fan shape and laterally in approximately symmetrical directions with respect to a midpalatal suture of the maxilla as a center line with movement of the two intermediate structures being driven in the directions of opening on the front end side with the respective hinges as the fulcrums, by the rotation operation of the screw.

5. The orthodontic expansion device according to claim 1, further comprising:
   two intermediate support shafts that are each pivotally supported by a front end of a respective one of the intermediate structures, wherein
   the screw is rotatably supported by the front end of the intermediate structures via the intermediate support shafts, and a width between the two intermediate support shafts in a lateral direction is wider than a width between the two hinges in the lateral direction.

6. The orthodontic expansion device according to claim 1, wherein each bend portion is u-shaped.

* * * * *